April 20, 1943.  P. T. GALT, JR  2,317,266
ELECTRIC SWITCHING SYSTEM
Filed Oct. 13, 1938
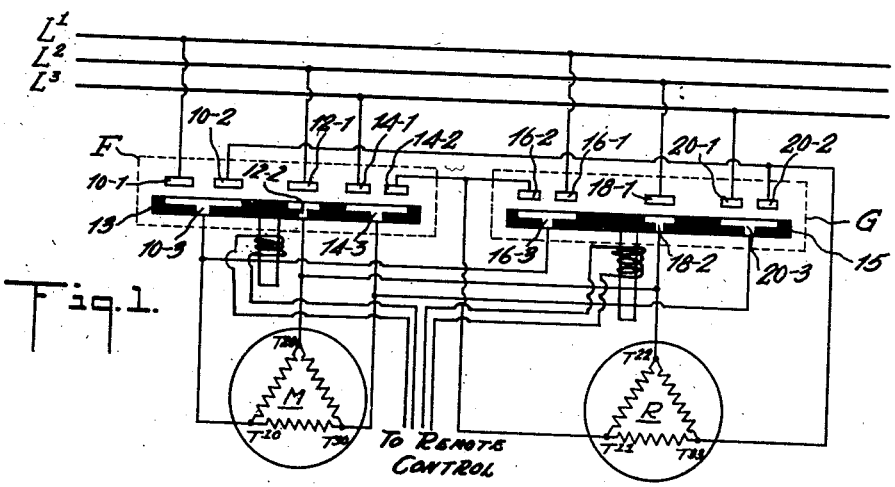
Fig. 1.
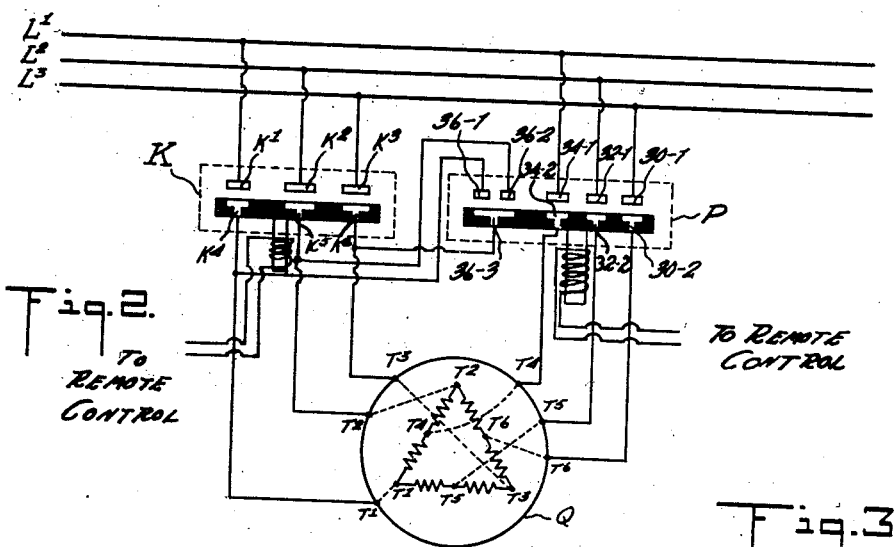
Fig. 2.
Fig. 3.
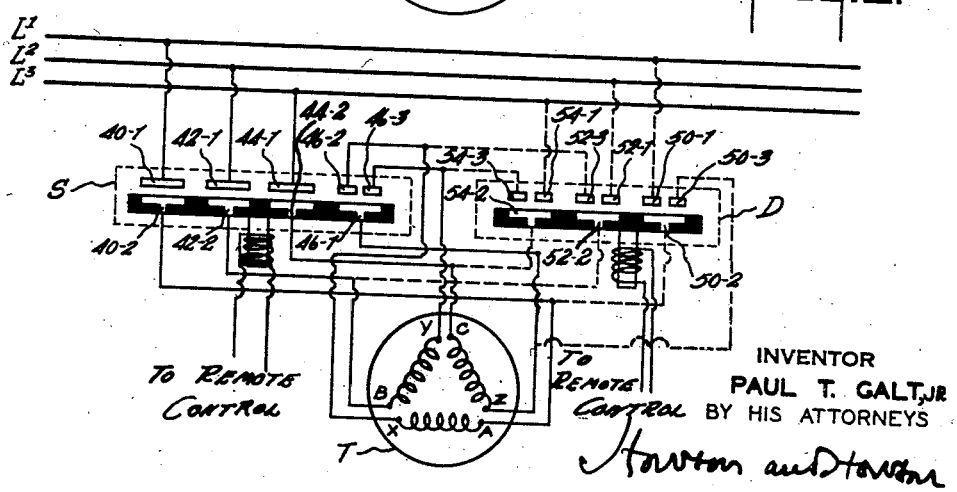
INVENTOR
PAUL T. GALT, JR
BY HIS ATTORNEYS Patented Apr. 20, 1943

2,317,266

UNITED STATES PATENT OFFICE 2,317,266

ELECTRIC SWITCHING SYSTEM

Paul T. Galt, Jr., Hartford, Conn., assignor to The Arrow-Hart & Hegeman Electric Company, Hartford, Conn., a corporation of Connecticut Application October 13, 1938, Serial No. 234,836

4 Claims. (Cl. 172—179)

The invention is particularly concerned with systems for remote control of electrical motors and like devices. Heretofore, remote control was commonly and customarily accomplished through the agency of electromagnetic switches, which are relatively expensive to manufacture and to install and generally included a large number of sets of stationary contacts which were joined by a floating bridging contacts that had no connection with any line or part of the circuit except as it became a part of the circuit upon switch closure.

Heretofore in commercial practice in certain installations where there was employed a main motor and a reversible motor it was necessary to use three electromagnetic switches to accomplish forward rotation and reverse rotation of the reversible motor and at the same time to continue the main motor running in its forward direction. In other 3-phase work where a two-speed motor was employed and it was desired to connect the windings of that motor in delta formation to run the motor fast, and to re-arrange the winding connection into a form of star connection to run the motor slow, it was necessary to employ three electromagnetic switches, two of which had to be closed when the motor was to run at slow speed. In another form of motor in which the windings were to be connected in star formation at the starting of the motor and in delta formation during the running of the motor it was necessary to employ three electromagnetic switches, two of which had to be closed when the motor was starting and two of which had to be closed while the motor was running. Other examples will occur to those skilled in the art, of the use of three or more switches which make for high cost of the installations where simple switching functions are to be performed. Due to intensive competition it is obviously desirable to reduce, wherever possible, the cost of installation and to simplify wiring and labor costs.

It is an object of this invention to provide a simplified electric switching system whereby the number of electromagnetic switches and the number of contacts heretofore required may be reduced, thereby reducing the cost of equipment and wiring in remotely controlled electric switching systems.

It is an object of this invention to provide a simplified remotely controlled electric switching system whereby the number of electromagnetic switches and the number of contacts heretofore required for switching functions of variable speed motors of the consequent pole type or where the windings of the motors are reconnected may be reduced. Other objects and advantages of my invention will appear as it is described in connection with the accompanying drawing.

In the drawing—

Fig. 1 is a diagrammatic view of a 3-phase power line connected to a main motor and a reversible motor by two electromagnetic switches and circuit connections embodying the principles of my invention;

Fig. 2 is a diagrammatic view of a 3-phase power line and a 3-phase two-speed motor having a plurality of windings connected by two electromagnetic switches and circuit connections embodying the principles of my invention;

Fig. 3 is a diagrammatic view of a 3-phase power system with a motor in which the winding may be connected in star or delta formation by two electromagnetic switches and circuit connections embodying the principles of my invention.

Referring to Figure 1, the supply lines of a 3-phase power system are indicated by $L^1$, $L^2$ and $L^3$. These lines are adapted to be connected by electromagnetic switches F and G to the main motor M and the reversible motor R. When only the switch F is closed the main motor and the reversible motor run in a forward direction. When the switch G is closed and the switch F is open the main motor runs forward and the reversible motor is reversed.

The motors as shown are 3-phase motors with their windings connected in delta formation, the terminal points being indicated by $T^{10}$, $T^{20}$ and $T^{30}$ and $T^{11}$, $T^{22}$ and $T^{33}$.

Referring to the switch F it will be noted that there are provided three sets of contacts, 10—1, 10—2 and 10—3; 14—1, 14—2 and 14—3; and 12—1, 12—2. One of each of these sets of contacts, 10—1, 12—1 and 14—1, are connected to the power lines $L^1$, $L^2$ and $L^3$. Another of each of these sets of contacts, such as 10—3, 12—2 and 14—3 are each connected to the terminals of the motor windings, that is, to $T^{10}$, $T^{20}$ and $T^{30}$. The remaining contacts 10—2 and 14—2 are connected to the terminals $T^{33}$ and $T^{11}$, respectively, of the reversible motor R. The contact 12—2 is also connected to the terminal $T^{22}$ of the reversible motor R.

The reversing switch G is also provided with three sets of contacts, for example, 16—1, 16—2 and 16—3. Of these sets, contacts 16—1, 18—1 and 20—1 are connected to the power lines $L^1$, $L^2$ and $L^3$, respectively, while the contacts 16—2, 20—2 are connected to the terminals $T^{11}$ and $T^{33}$, respectively, of the reversible motor R. The contacts 16—3 and 20—3 are connected to the terminals $T^{10}$ and $T^{30}$ of the main motor M.

It is important to note that in the sets which have three contacts, one of the contacts is always a bridging contact, for example, 10—3. Therefore when the switch is closed, such as by moving the insulating contact-carrying bars 13 and 15 upwardly in Figure 1, the contacts 10—1, 10—2 will be bridged by the contact 10—3. In like manner the contacts 14—1, 14—2 and 14—3 will be mutually connected as will also the contacts 16—1, 16—2 and 16—3 and 20—1, 20—2 and 20—3. By the novel use of a bridging contact as a wire contact, i. e., a contact to which a lead wire is connected, the number of contacts necessary in a switch to accomplish the required functions is reduced and also the number of switches which are necessary to accomplish forward and reverse rotation of the motor is also reduced over what heretofore has been necessary.

In the switching system to which the present invention is particularly adaptable the movable contacts of the switch were customarily actuated by electro-magnets. Therefore the use of additional electro-magnets was necessary and additional other equipment was required when more than two switches were used in the old system to accomplish the purpose of reversing the reversing motor.

In adapting the invention to commercial practice it will be advisable to employ interlocking means to prevent the closure of both switches F and G at the same time. This may be done by electro-magnetic interlocking devices or by mechanical interlocking means between the two switches. Such means are common and form no part of this invention and therefore need not be described herein.

It will be obvious to those skilled in the art that it is not essential that contacts 10—3, 12—2 and 14—3 be movable contacts. It is only necessary that one of the contacts of the set 10—1, 10—2 and 10—3 be movable and that the movable contact bridge the stationary contacts of its set. The same applies to the other sets of three contacts. Of course as to the sets of two contacts it is immaterial which is movable.

Referring now to the form of invention shown in Fig. 2, it will be noted that the supply is again from a 3-phase line. In this case a motor Q has a 3-phase winding embodying six coils. These coils are connected in sequence, the terminal points being indicated by $T^1$, $T^2$, $T^3$, $T^4$, $T^5$ and $T^6$. It will be understood, however, that the showing of six coils is merely illustrative and that the number of coils is in no way limited by the diagram. The motor Q is adapted to be connected to the power line by either the electromagnetic switch K or the electromagnetic switch P, alternately. But only one switch may be operated at a time due to interlocking devices (not shown). If the motor is to be run fast the switch K will be closed and if the motor is to be run slow the switch P will be closed and the switch K will be opened. The switch K comprises three contacts, $K^1$, $K^2$ and $K^3$ which are connected to the line $L^1$, $L^2$ and $L^3$. These contacts are engaged by movable contacts $K^4$, $K^5$ and $K^6$, respectively, which are connected to the terminals $T^1$, $T^2$ and $T^3$ of the motor Q. The closing of the switch K will therefore connect the windings of the motor Q in delta formation.

The switch P comprises four sets of contacts. The fixed contacts of set 30—1, 32—1, 34—1 are connected to the supply lines $L^1$, $L^2$ and $L^3$, respectively. The movable contacts of these sets which engage with the fixed contacts when the switch is closed are connected respectively with the intermediate terminals $T^6$, $T^5$ and $T^4$ of the windings of the motor Q. The fourth set of contacts in the switch P has three contacts 36—1, 36—2 and 36—3. The contact 36—3 is a bridging contact which connects contact 36—1 and 36—2 together when the switch is closed. These contacts 36—1, 36—2 and 36—3 are connected respectively with the terminals $T^1$, $T^2$ and $T^3$ of the motor Q. It will now be apparent that when the contacts 36—1, 36—2 and 36—3 are connected together the terminals $T^1$, $T^2$ and $T^3$ of the motor windings will also be connected together. Therefore in the closed position of the switch P the motor windings of the motor Q will be connected in a star formation. Thus with a fewer number of contacts and less equipment and less wiring I am able to accomplish the object of switching from the fast to a slow speed arrangement in a more effective and in a more economical manner than in the prior art.

In the switch P, as in the previously described form of the invention in Fig. 1, it is immaterial which of the contacts are movable and which are fixed. All that is necessary is that one of the contacts of the first three sets engage the other contacts of that set and in the fourth set that one of he contacts bridge the other two.

Referring now to the form of invention shown in Figure 3, the object here sought is to change the connections of a 3-phase motor T so that the windings are connected in star formation to start the motor and are connected in delta formation for normal running conditions. The supply is again a 3-phase line and the control of the motor is through electromagnetic switches S and D. When the switch S is closed the motor will start with the windings connected in star formation and when the switch S is open and the switch D is closed the motor will run with the windings in delta formation.

The motor T has its three windings diagrammatically shown with terminals X, Y and Z at one end of each winding and terminals A, B and C at the other end of these windings.

Switch S comprises four sets of contacts, the first three sets having their fixed contacts 40—1, 42—1 and 44—1 connected to lines $L^1$, $L^2$ and $L^3$ respectively. The movable contacts 40—2, 42—2 and 44—2 which engage with the fixed contacts, respectively, are connected respectively with the terminals A, B and C of the motor windings. The fourth set of contacts comprises three contacts 46—1, 46—2 and 46—3. These contacts are connected respectively with the terminals D, X and Y of the motor windings. It will be noted that the contact 46—1 is a bridging contact which connects contacts 46—2 and 46—3 when the switch is closed. It will now be observed that when the switch S is closed the terminals X, Y and Z are connected together and that the terminals A, B and C are connected to the line. Therefore the motor windings are connected in star formation for the starting operation of the motor.

The switch D comprises three sets of contacts, in each set there being three separate contacts. One contact of each set, 50—1, 52—1 and 54—1, are connected to the power lines $L^1$, $L^2$ and $L^3$ respectively. Another of the contacts of each set, 50—2, 52—2, 54—2, are connected to the terminals A, B and C of the windings of the motor. The third contact of each set 50—3, 52—3 and 54—3 are connected respectively to the terminals Z, X and Y of the motor windings. It will be observed that when the switch D is closed the contacts 50—2 and 52—2 and 54—2 are bridging contacts and they connect stationary contacts 50—1, 50—3 and 52—1, 52—3 and 54—1, 54—3 together respectively. Thus the first set of contacts connects the terminals Z and A together and to the power line $L^1$, while the second set of contacts connects the terminals B and X together and to the power line $L^2$, while the third set of contacts connects the terminals C and Y together and to the power line $L^3$. Therefore the motor windings will be connected in delta formation. In Figure 3 as in the previous forms, the choice of the bridging contact is optional and it may be either stationary or movable so long as it engages with the remaining two contacts of its set when the switch is closed.

From the foregoing it will be observed that I have provided a new method using a minimum number of remotely controlled electromagnetic switches for accomplishing the change from a star to a delta or other formation of windings of one or more motors of the consequent pole type, or wherein windings are reconnected and that my system affords a less number of contacts and a less number of connections than the usual three-switch system which has been employed commercially heretofore.

Many modifications within the scope of my invention will occur to those skilled in the art, therefore I do not limit the invention to the specific embodiments described.

I claim:

1. In an alternating current switching system, 3-phase power lines, a motor having windings connectible in delta or star formations to said lines, an electro-magnetic switch for connecting said windings in star formation including contacts connected to said lines and contacts connected to one end of each of said windings, said switch including a set of three contacts connected to the other ends of said windings, said three contacts being electrically separate in switch-open position and electrically common in switch-closed position, a second electro-magnetic switch for connecting said windings in delta formation, said switch having only three contacts connected to said lines, and only three other contacts engageable therewith and connected to said windings.

2. In an alternating current switching system, 3-phase power lines, a motor having windings connectible in delta or in a star formation, an electro-magnetic switch having line-connected contacts and other contacts connected to the ends of said windings in delta formation, a second electro-magnetic switch operable independent of said first switch and having line-connected contacts and contacts connected to intermediate points of said windings and having a set of three contacts connected to said other contacts of said first switch, said set of contacts being engaged and electrically-common on closure of said second switch to connect said intermediate points of the windings in star formation and being mutually isolated in open position of said second switch.

3. In an alternating current switching system, 3-phase power lines, a motor having 3-phase windings and at least six terminals connected to spaced points on said windings, a switch having three line-connected contacts and three contacts connected to three of said terminals which are connected to said windings at equally spaced points, said three terminal connected contacts being engageable with said three line-connected contacts respectively upon switch closure, and a set of three contacts which are mutually engaged in switch-closed position and which are connected to three of the remaining terminals of said motor, said remaining terminals being connected to said windings at points equally spaced from said first three terminal-connected contacts, whereby a star connection of said winding is established in switch-closed position only.

4. In an alternating current switching system, 3-phase power lines, a motor having 3-phase windings and at least six terminals connected to spaced points on said windings, an electro-magnetic switch having three line-connected contacts and three contacts connected to three of said terminals which are connected to said windings at predetermined points, said three terminal-connected contacts being engageable with said three line-connected contacts respectively upon switch closure, and a set of three contacts which are mutually engaged in switch-closed position and which are connected to three of the remaining terminals of said motor, said remaining terminals being connected to said windings at points spaced from said predetermined points, whereby a star connection of said winding is established in switch-closed position only.

PAUL T. GALT, Jr.

CERTIFICATE OF CORRECTION.

Patent No. 2,317,266. April 20, 1943.

PAUL T. GALT, JR.

It is hereby certified that error appears in the printed specification of the above numbered patent requiring correction as follows: Page 1, first column, line 1, before the words "The invention" insert the following paragraph -

--This invention relates to electric switching systems. More particularly it relates to electric switching systems for 3-wire power lines and motors such as 3-phase lines and motors, but the principles of the invention are adaptable to electric switching generally. -- and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.